(12) United States Patent
Lee et al.

(10) Patent No.: US 6,697,562 B1
(45) Date of Patent: Feb. 24, 2004

(54) DISPERSION CONTROL FIBER AND METHOD OF MANUFACTURING LARGE SIZE PREFORM THEREOF

(75) Inventors: Ji-Hoon Lee, Taegu-Kwangyokshi (KR); Mun-Hyun Do, Kyongsangbuk-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 43 days.

(21) Appl. No.: 09/619,715

(22) Filed: Jul. 19, 2000

(30) Foreign Application Priority Data

Jul. 22, 1999 (KR) .......................... 1999-29828

(51) Int. Cl.[7] .................................................. G02B 6/00
(52) U.S. Cl. ...................................................... 385/142
(58) Field of Search ............................. 65/17.3, 17.4, 65/385, 413; 385/141, 142, 144, 123, 124, 126, 127, 128

(56) References Cited

U.S. PATENT DOCUMENTS

| | | |
|---|---|---|
| 4,389,230 A | 6/1983 | Modone et al. |
| 4,412,853 A | 11/1983 | Partus |
| 4,425,146 A * | 1/1984 | Izawa et al. ............... 65/17.4 |
| 4,468,413 A | 8/1984 | Bachmann |
| 5,056,888 A | 10/1991 | Messerly et al. |
| 5,237,576 A | 8/1993 | DiGiovanni et al. |
| 5,397,372 A | 3/1995 | Partus et al. |
| 5,675,690 A | 10/1997 | Nouchi et al. |
| 5,692,087 A | 11/1997 | Partus et al. |
| 5,721,800 A | 2/1998 | Kato et al. |
| 5,961,682 A | 10/1999 | Lee et al. |

FOREIGN PATENT DOCUMENTS

| | | |
|---|---|---|
| JP | 57-011848 | 1/1982 |
| JP | 60-050503 | 3/1985 |
| JP | 63-217310 | 9/1988 |
| JP | 09-175829 | 7/1997 |

* cited by examiner

Primary Examiner—Euncha Cherry
(74) Attorney, Agent, or Firm—Robert E. Bushnell, Esq.

(57) ABSTRACT

A dispersion control fiber and a method of manufacturing a large size preform. The dispersion control fiber includes a core composed of $SiO_2$, $GeO_2$, and $P_2O_5$, and a cladding composed of $SiO_2$, $GeO_2$, $P_2O_5$, and Freon. The $P_2O_5$ content is selected not to exceed 10% total weight of a compound composing the core. The method of manufacturing a large size perform for a dispersion control fiber by an MCVD process includes depositing $SiO_2$, $GeO_2$, $P_2O_5$, and Freon in an inner periphery of a deposition tube to form a cladding layer, and depositing $SiO_2$, $GeO_2$, and $P_2O_5$ on an inner periphery of the cladding layer to form a core layer.

8 Claims, 6 Drawing Sheets

FIG. 8B

DISPERSION CONTROL FIBER AND METHOD OF MANUFACTURING LARGE SIZE PREFORM THEREOF

CLAIM OF PRIORITY

This application makes reference to, incorporates the same herein, and claims all benefits accruing under 35 U.S.C. §119 from my application DISPERSION CONTROL FIBER AND A LARGE SIZE PREFORM MANUFACTURE METHOD THEREOF filed with the Korean Industrial Property Office on Jul. 22, 1999 and there duly assigned Ser. No. 29828/1999.

BACKGROUND OF THE INVENTION

1. Field of the Invention

The present invention relates to an optical fiber and a manufacturing method thereof, and more particularly to a dispersion control fiber and a method of manufacturing a large size preform thereof.

2. Description of the Related Art

Optical fibers as widely used as new media for transmitting information are largely classified into a single mode fiber and a multi mode fiber, according to the transmitting mode. The single mode fiber is also classified into a single mode fiber and a dispersion control fiber.

The dispersion control fiber comprises a dispersion shifted fiber with a zero dispersion wavelength band shifted to a wavelength band of 1.5 $\mu$m, a dispersion flattened fiber with a constant dispersion value in a wide wavelength band of 1.3~1.6 $\mu$m, and a non-zero dispersion shifted fiber with a low dispersion value in a wavelength band of 1.5~1.6 $\mu$m. The dispersion shifted fiber is disclosed in U.S. Pat. No. 5,721,800 issued to Kato, et al., and the dispersion flattened fiber is disclosed in U.S. Pat. No. 5,675,690 issued to Nouchi, et al.

While the optical fibers have been made directly from raw materials, most of them generally have been made from a separate preform heated above a softening point within a furnace.

The length of an optical fiber capable of being drawn from the preform is dependent upon the diameter of the preform. In particular, since the drawing amount of the optical fiber is proportional to the preform diameter, methods of manufacturing a large size preform have been proposed. The size enlargement of preforms can be achieved by enlarging the diameter of a first preform formed by the deposition and collapse, and by enlarging the diameter of a tube for over-cladding.

Figure 1:
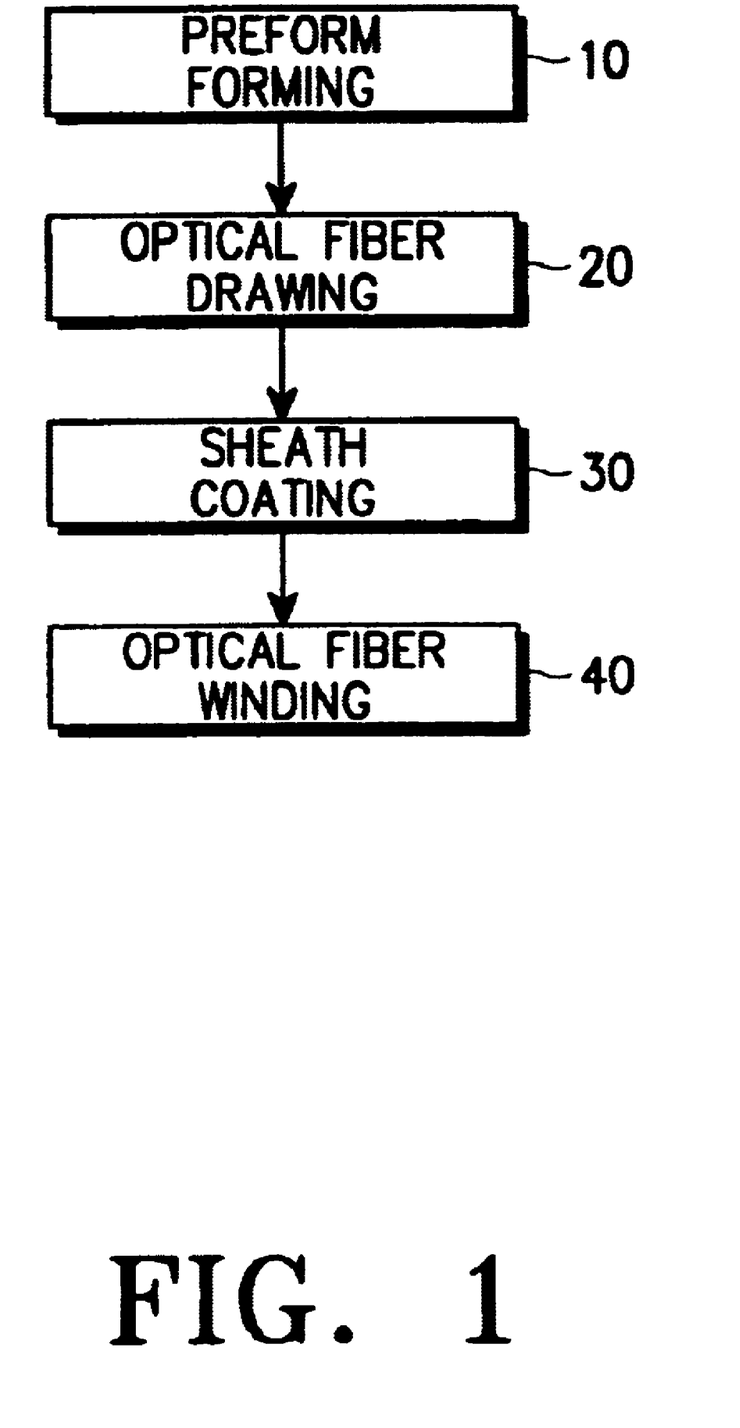
FIG. 1 is a flow chart showing the process of manufacturing a general optical fiber.

FIG. 1 is a flow chart showing the process of manufacturing a general optical fiber As shown in FIG. 1, the general method of manufacturing the optical fiber includes the steps of forming a preform (step 10), drawing the optical fiber (step 20), coating a sheath around the outer periphery of the optical fiber (step 30), and winding the optical fiber (step 40). Generally, the steps of drawing and coating are continually performed within a fiber drawing apparatus.

The step 10 is a process of forming a base preform to draw the optical fiber. The method of forming the preform includes a vapor-phase axial deposition (VAD) method, an outer chemical vapor-phase deposition (OCVD) method, a plasma chemical vapor-phase deposition (PCVD) method, and a modified chemical vapor-phase deposition (MCVD) method, the MCVD method being widely used.

The process of manufacturing the preform by the MCVD method will hereinafter be explained in detail. Gas such as $SiCl_4$ or $GeCl_4$ is introduced in a deposition tube rotated at a constant speed, and a burner movable left and right heats the outer periphery of the tube. Particles are deposited on the inner surface of the deposition tube. The deposited particles are sintered, collapsed and closed by the heat of the burner to form a first preform with a core layer and a cladding layer. The first preform is treated by over-cladding to form a resultant preform.

The refractive difference between the core and cladding can be selected by adjusting components of gas supplied into the deposition tube, and the process of manufacturing the preform by using the MCVD method is disclosed in U.S. Pat. Nos. 4,389,230 and 5,397,372 in detail.

The drawing and coating steps 20 and 30 are continually performed in the optical fiber apparatus provided with a furnace and a coating machine to draw the optical fiber from the preform. When the preform is heated above a softening point in the furnace, the optical fiber is drawn through a drawing hole provided on the lower end of the furnace. Then, the optical fiber is coated by passing through the coating machine, and cooled by passing through a cooling machine.

In the winding step 40, the optical fiber is applied with a stress by a capstan, and is wound around a spool.

Figure 2:
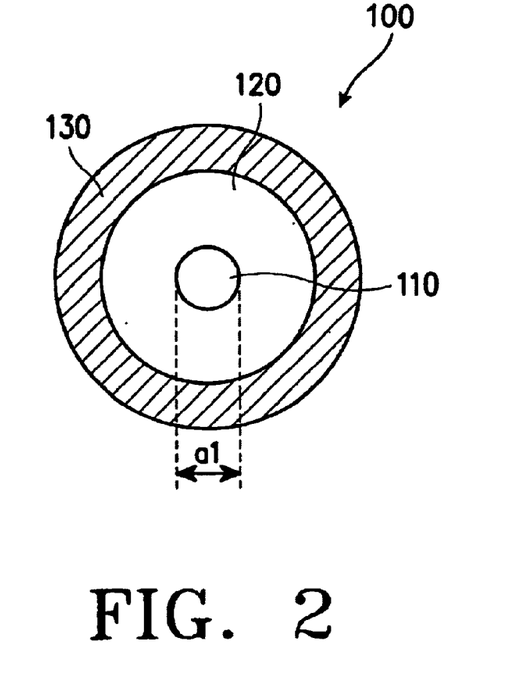
FIG. 2 is a cross sectional view illustrating the structure of a general single mode fier.
Figure 3:
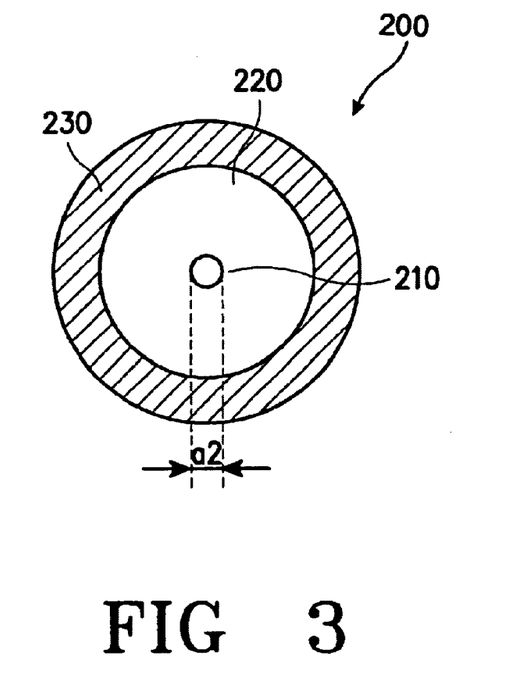
FIG. 3 is a cross sectional view illustrating the structure of a conventional dispersion control fiber.

FIG 2 is a cross sectional view illustrating the structure of a general single mode fiber, and FIG. 3 is a cross sectional view illustrating the structure of a conventional dispersion control fiber. The shown optical fibers mainly consist of $SiO_2$.

As shown in FIGS. 2 and 3, the general single mode fiber and the conventional dispersion control fiber include a core 110 or 210, a cladding 120 or 220, and a sheath 130 or 230, respectively.

$SiO_2$ is a main component of the core 110 or 210, and $GeO_2$ is added to adjust the refractive index distribution. The cladding 120 or 220 includes $GeO_2$, $P_2O_5$ and Freon to adjust the refractive index distribution or reduce the deposition temperature, in addition to $SiO_2$. While the claddings 120 and 220 are shown in a single layer to be easily understood, a multi-layered cladding formed by over-cladding may be adopted.

Generally, the single mode fiber 100 has a core diameter of 8~12 $\mu$m and a relative refractive index of 0.35, and the dispersion control fiber 200 has a core diameter of 5~8 $\mu$m and a relative refractive index of 0.7~0.15. In other words, the core 210 of the dispersion control fiber 200 has a diameter smaller than that of the general single mode fiber 100, but has a refractive index higher than that of the single mode fiber. The relative refractive index is expressed by $(n1^2-n2^2)/(2n1^2)*100$, wherein n1 is a maximum refractive index of the core, and n2 is a minimum refractive index.

The sheaths 130 and 230 function as inner protective layers for preventing the cores 110 and 210 and the claddings 1 20 and 220 from mechanical or chemical damage. The sheaths 130 and 230 are made of a plastic material such as a thermosetting resin.

Table 1 shows a variation of the optical characteristics of the general single mode fiber and the prior dispersion control fiber. In Table 2, the variation of the optical characteristics and the deformation of the deposition tube are indicated in dependence on the diameter increment of the preform and the drawing temperature. In Table 1, S represents $SiO_2$, G represents $GeO_2$, P represents $P_{25}$, and F represents Freon.

TABLE 1

| Example of Prior Art | Diameter of preform (mm) | Class | Composition of core | Composition of cladding | Variation of optical characteristics ||| Shrink deformation of deposition tube |
| --- | --- | --- | --- | --- | --- | --- | --- | --- |
| | | | | | Zero dispersion wavelength (nm) | Mode field diameter ($\mu$m) | Dispersion slope (ps/nm$^2$km) | |
| 1 | 50 | S.M.F. | S + G | S + G + P + F | 0~2 | 0~0.5 | 0~0.0001 | No |
| 2 | 66 | S.M.F. | S + G | S + G + P + F | 0~2 | 0~0.2 | 0~0.0001 | No |
| 3 | 50 | D.C.F. | S + G | S + G + P + F | 1~3 | 0~0.2 | 0~0.0001 | No |
| 4 | 66 | D.C.F. | S + G | S + G + P + F | 20~40 | 0.2~0.5 | 0.004~0.009 | No |

Variation of drawing temperature depending on the increasing diameter of preform: 20° C., diameter of core: 8~8 $\mu$m,
Relative refractive index ratio(%): 0.35
S.M.F. represents a single mode fiber, and D.C.F. represents a dispersion control fiber.

As can be seen from the examples 1 and 2, even though in the case of a general single mode fiber, it is drawn at an increased drawing temperature, there is no or little variation in the photo characteristics, such as the zero dispersion wavelength, the mode field diameter, and the dispersion slope in so far as the drawing of the fiber is carried out under the condition in which the preform used has a size enlarged from 50 mm to 66 mm, as compared to the case using a preform involving no size enlargement.

However, as seen from the examples 3 and 4, even though in the case of a dispersion control fiber, it is drawn using a preform varied in diameter from 50 mm to 66 mm, there is significant variation in the photo characteristics, such as the zero dispersion wavelength, the mode field diameter, and the dispersion slope, as compared to the case using a preform involving no size enlargement. This is because the core and clad of the dispersion control fiber are made of different compositions, and because the dispersion control fiber has a relatively small core diameter, as compared to that of the single mode fiber.

That is, the conventional dispersion control fiber includes a core composed of $SiO_2$ and $GeO_2$, and a cladding composed of $SiO_2$, $GeO_2$, $P_2O_5$, and Freon, and the diameter of the core is smaller than that of the single mode fiber. Accordingly, when such a dispersion control fiber is drawn at an increased drawing temperature using a preform enlarged in diameter, stress may be generated due to a non-uniform temperature distribution between the core and the cladding. Furthermore, the refractive index distribution in the core may vary due to a viscosity difference between the core and the cladding.

The varied refractive index distribution in the core, as will be seen from the examples 3 and 4, induces a variation in the optical characteristics of the dispersion control fiber. For example, the zero dispersion wavelength is varied 20~40 nm, the mode field diameter is varied 0.2~0.5 $\mu$m, and the dispersion slope is varied 0.004~0.009 ps/nm$^2$, relative to the dispersion control fiber with the preform having a smaller diameter.

SUMMARY OF THE INVENTION

It is an object of the present invention to solve the problems involved in the prior art, and to provide a dispersion control fiber and a method of manufacturing a large size preform.

In order to achieve the above object, according to one aspect of the present invention, there is provided a dispersion control fiber including a core composed of $SiO_2$, $GeO_2$, and $P_2O_5$, and a cladding composed of $SiO_2$, $GeO_2$, $P_2O_5$, and Freon.

According to another aspect of the present invention, there is provided a dispersion control fiber including a core composed of $SiO_2$, $GeO_2$, $P_2O_5$ and Freon, and a cladding composed of $SiO_2$, $GeO_2$, $P_2O_5$, and Freon.

According to still another aspect of the present invention, there is provided a dispersion control fiber including a core composed of $SiO_2$, $GeO_2$, and $P_2O_5$, a first cladding composed of $SiO_2$, $GeO_2$, $P_2O_5$, and Freon, and disposed around an outer periphery of the core, and a second cladding composed of $SiO_2$ only, and disposed around an outer periphery of the first cladding.

According to still another aspect of the present invention, there is provided a method of manufacturing a large size preform for a dispersion control fiber by an MCVD process, the method including the steps of depositing $SiO_2$, $GeO_2$, $P_2O_5$, and Freon in an inner periphery of a deposition tube to form a cladding layer, and depositing $SiO_2$, $GeO_2$, and $P_2O_5$ on an inner periphery of the cladding layer to form a core layer.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiments of the present invention will now be explained in detail with reference to the accompanying drawings. In the following description of the present invention, a detailed description of known functions and configurations incorporated herein will be omitted.

Figure 4:
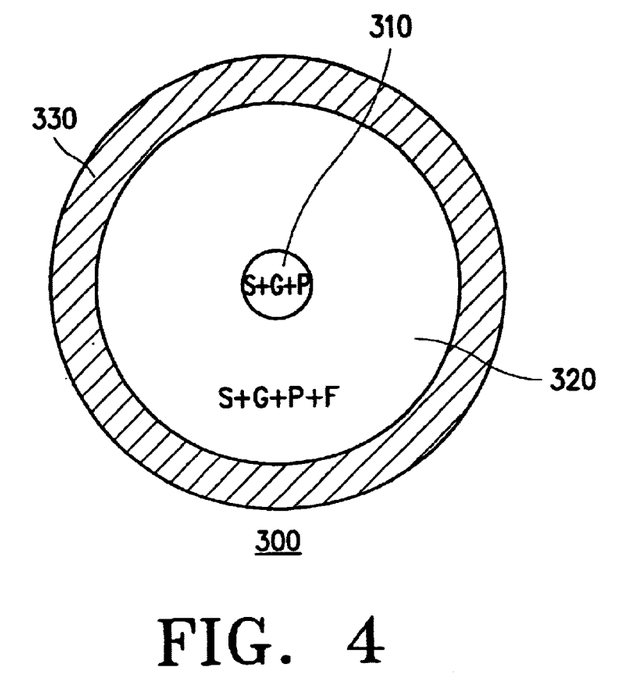
FIG. 4 is a cross sectional view illustrating the structure of a dispersion control fiber according to a first embodiment of the present invention.
Figure 5:
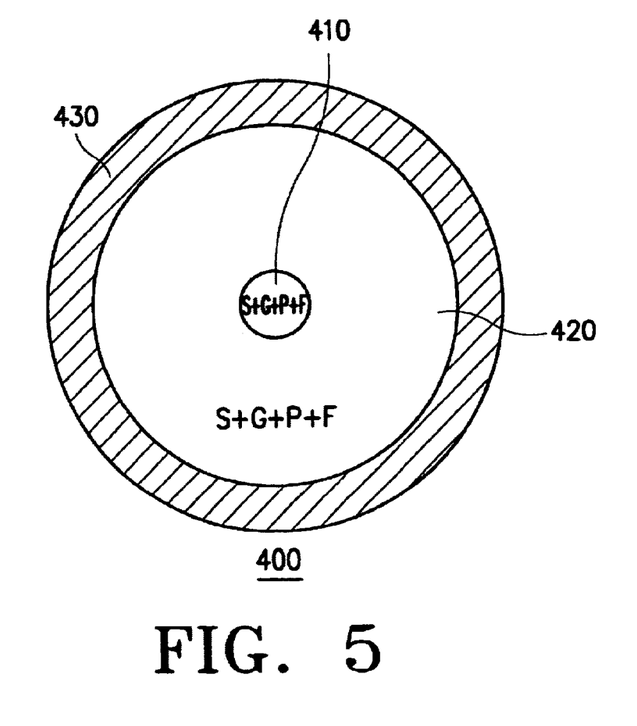
FIG. 5 is a cross sectional view illustrating the structure of a dispersion control fiber according to a second embodiment of the present invention.
Figure 6:
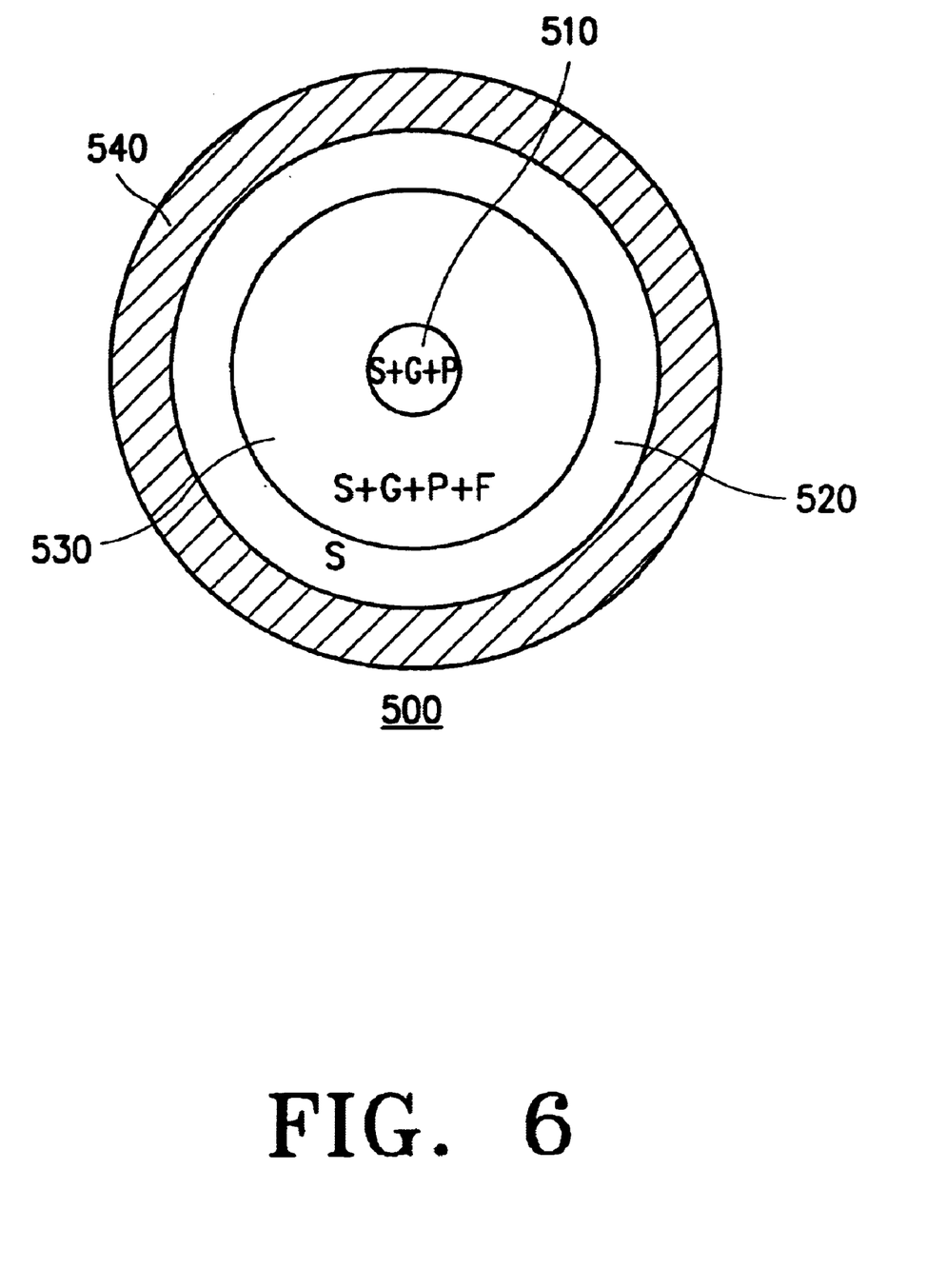
FIG. 6 is a cross sectional view illustrating the structure of a dispersion control fiber according to a third embodiment of the present invention.

FIG. 4 is a cross sectional view illustrating the structure of a dispersion control fiber according to a first embodiment of the present invention, FIG. 5 is a cross sectional view illustrating the structure of a dispersion control fiber according to a second embodiment of the present invention, and FIG. 6 is a cross sectional view illustrating the structure of a dispersion control fiber according to a third embodiment of the present invention. In the drawings, a core and a cladding are indicated by a proper component, respectively; S represents $SiO_2$, G represents $GeO_2$, P represents $P_2O_5$, and F represents Freon.

As shown in FIG. 4, the dispersion control fiber 300 according to a first embodiment of the present invention includes a core 310 composed of $SiO_2$, $GeO_2$, and $P_2O_5$, and a cladding 320 composed of $SiO_2$, $GeO_2$, $P_2O_5$, and Freon. A sheath 330 is disposed around the outer periphery of the cladding 320.

$SiO_2$ is a main component of the core 310 and the cladding 320, and $GeO_2$ is added to adjust the refractive index distribution of the core 310 and the cladding 320. $P_2O_5$ takes a role of reducing a viscosity difference between the core and the cladding, as well as a deposition temperature thereof. Also, the Freon takes a role of reducing the refractive index of the cladding.

The $P_2O_5$ content to be added in the compound of the core 310 should not exceed 10% of the total weight of a compound composing the core. $P_2O_5$ included in the core 310 serves to reduce the viscosity difference between the core and the cladding. Such a viscosity difference may occur due to different compositions of the core and the cladding. Therefore, the unbalance of temperature distribution caused by the viscosity difference between the core and the cladding may be minimized upon drawing. If the amount of $P_2O_5$ to be included in the core 310 is greater than 10% of the total weight of the compound composing the core, a geometrical deformation may occur due to an increased absorbing loss and a decreased viscosity of the core 310.

$GeO_2$, $P_2O_5$, and Freon contents can be adjusted such that the relative refractive difference between the core 310 and the cladding 320 is greater than 0.35 which is the relative refractive ratio of a core to a cladding according to the general single mode fiber. The compound ratio of $P_2O_5$ to the compound composing the core 310 may be selected to increase or decrease from the center of the core to its periphery, or maintained independently of any position in the cross section of the core.

As shown in FIG. 5, the dispersion control fiber 400 according to a second embodiment of the present invention includes a core 410 composed of $SiO_2$, $GeO_2$, $P_2O_5$, and Freon, and a cladding 420 composed of $SiO_2$, $GeO_2$, $P_2O_5$, and Freon. A sheath 430 is disposed around the outer periphery of the cladding 420. Specifically, the dispersion control fiber 400 according to the second embodiment of the present invention is substantially similar to the first embodiment of the present invention, except that the Freon is additionally added in the core.

The $P_2O_5$ content to be added in the compound of the core 410 has to be selected not to exceed 10% of the total weight of a compound composing the core. $P_2O_5$ included in the core 410 reduces the viscosity difference between the core and the cladding, the viscosity difference being caused by the different components each composing the core and the cladding. Therefore, the unbalance of temperature distribution caused by the viscosity difference between the core 410 and the cladding 420 may be minimized upon drawing. If the amount of $P_2O_5$ to be included in the core 410 is greater than 10% of the total weight of the compound composing the core, a geometrical deformation may occur due to an increased absorbing loss and a decreased viscosity of the core 410. $SiO_2$ is a main component of the core 410 and the cladding 420, and $GeO_2$ is added to adjust the refractive index distribution of the core 410 and the cladding 420. $P_2O_5$ takes a role of reducing the viscosity difference between the core and the cladding, as well as the deposition temperature thereof. Also, the Freon takes a role of reducing not only the refractive index of the cladding, but also the viscosity difference between the core 410 and the cladding 420.

As shown in FIG. 6, the dispersion control fiber 500 according to a third embodiment of the present invention includes a core 510 composed of $SiO_2$, $GeO_2$, and $P_2O_5$, a first cladding 530 composed of $SiO_2$, $GeO_2$, $P_2O_5$, and Freon, and a second cladding 520 composed of $SiO_2$ only. A sheath 540 is disposed around the outer periphery of the cladding 520.

The $P_2O_5$ content to be added in the compound of the core 510 has to be selected not to exceed 10% of the total weight of a compound composing the core, as the first and second embodiments described above. $P_2O_5$ included in the core 510 reduces the viscosity difference between the core and the cladding, the viscosity difference being caused by the different components each composing the core and the cladding. Therefore, the unbalance of temperature distribution caused by the viscosity difference between the core 510 and the cladding 530 may be minimized upon drawing.

$SiO_2$ is a main component of the core 510 and the first and second claddings 530 and 520, and $GeO_2$ is added to adjust the refractive index distribution of the core 510 and the first cladding 530. $P_2O_5$ takes a role of reducing viscosity difference between the core 510 and the first cladding 530, as well as deposition temperature thereof. Also, the Freon takes a role of reducing not only the refractive index of the first cladding 530, but also the viscosity difference between the core 510 and the first cladding 530.

Figure 7:
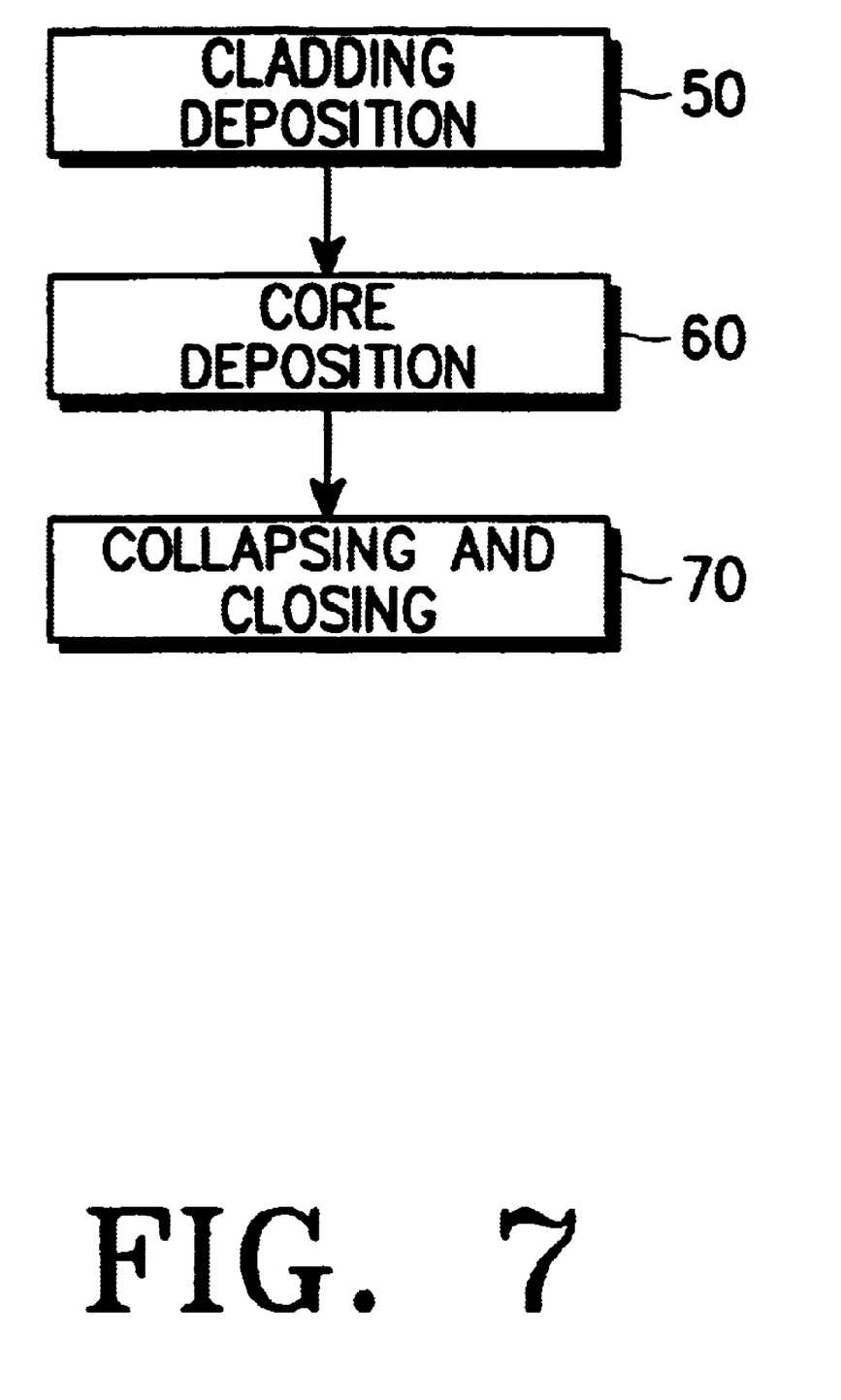
FIG. 7 is a flow chart showing the process of manufacturing a large size preform of a dispersion control fiber according to a preferred embodiment of the present invention.

FIG. 7 is a flow chart showing the process of manufacturing a large size preform of a dispersion control fiber according to a preferred embodiment of the present invention, wherein the process is performed by using the MCVD method.

The process of manufacturing the large size preform of the dispersion control fiber according to embodiments of the present invention includes mainly a cladding deposition step 50, a core deposition step 60, and a collapsing and closing step 70.

In the cladding deposition step 50, by supplying $SiO_2$, $GeO_2$, $P_2O_5$ and Freon in the interior of a rotatable deposition tube, and heating the tube by using a burner, a cladding layer composed of $SiO_2$, $GeO_2$, $P_2O_5$, and Freon may be deposited on the inner periphery of the deposition tube.

In the core deposition step 60, the core layer composed of $SiO_2$, $GeO_2$, $P_2O_5$, and Freon is deposited on the inner periphery of the cladding layer deposited on the deposition tube. At that time, the $P_2O_5$ content is adjusted not to exceed 10% of the total weight of the components composing the core. If the weight ratio of $P_2O_5$ exceeds 10% of the total weight of the core, a geometrical deformation may occur. Alternatively, a core layer composed of $SiO_2$, $GeO_2$ and $P_2O_5$ is deposited on the inner periphery of the cladding layer deposited on the deposition tube.

In the collapsing and closing step 70, the burner moves along the longitudinal direction of the deposition tube and heats the tube, thereby filling a hollow portion remaining in the center of the core layer.

It will be understood by those skilled in the art that the large size preform can be manufactured by a VAD, a OCVD or a PCVD method, as well as the MCVD described above.

Table 2 shows a variation of the optical characteristics of the dispersion control fiber drawn from the large size preform manufactured according to embodiments of the present invention. In Table 2, a variation in optical characteristics and a deposition tube deformation are indicated which depend on the diameter increase of the preform and the drawing temperature. Also, a variation in optical characteristics is also indicated with reference to comparative examples respectively corresponding to two embodiments of the present invention. In each of the comparative examples, its core and cladding is not added with $P_2O_5$, as different from the examples of the present invention.

cladding composed of $SiO_2$, $GeO_2$, $P_2O_5$, and Freon, as shown in FIG. 5. An optical fiber is drawn from the preform, and is tested for the optical characteristics, such as zero dispersion wavelength, the mode field diameter, and the dispersion slope, and the shrink deformation of the deposition tube.

Comparing the example 2 (3*) with the example 4 of the prior art (1*), of which an optical fiber is drawn from a large size preform that consisted of a core composed of $SiO_2$ and $GeO_2$, it is noted that the variation of optical characteristics is significantly reduced. Specifically, the zero dispersion wavelength is varied from 20~40 nm to 1~3 nm, the mode field diameter is varied from 0.2~0.5 mm to 0~0.2 mm, and the dispersion slope is varied from 0.004~0.009 ps/nm² to 0~0.001 ps/nm².

Figure 8A:
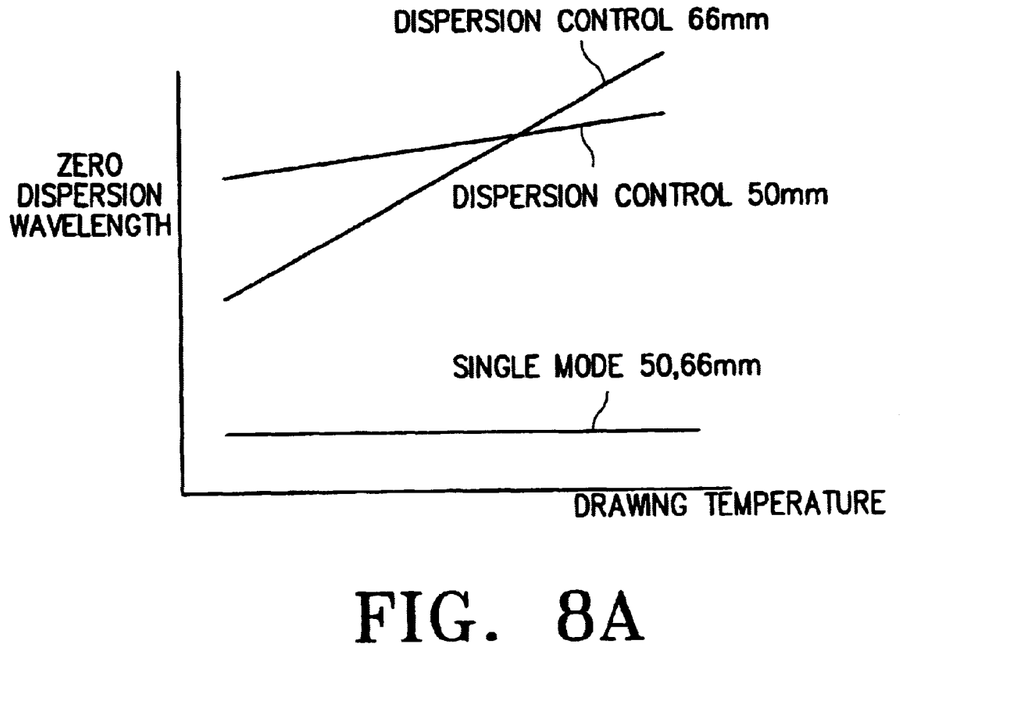
FIGS. 8A and 8B are graphs showing the relationship between a temperature of drawing an optical fiber and a changing amount of a zero dispersion wavelength of a large size preform of a dispersion control fiber according to a prior art and the present invention, respectively.
Figure 8B:
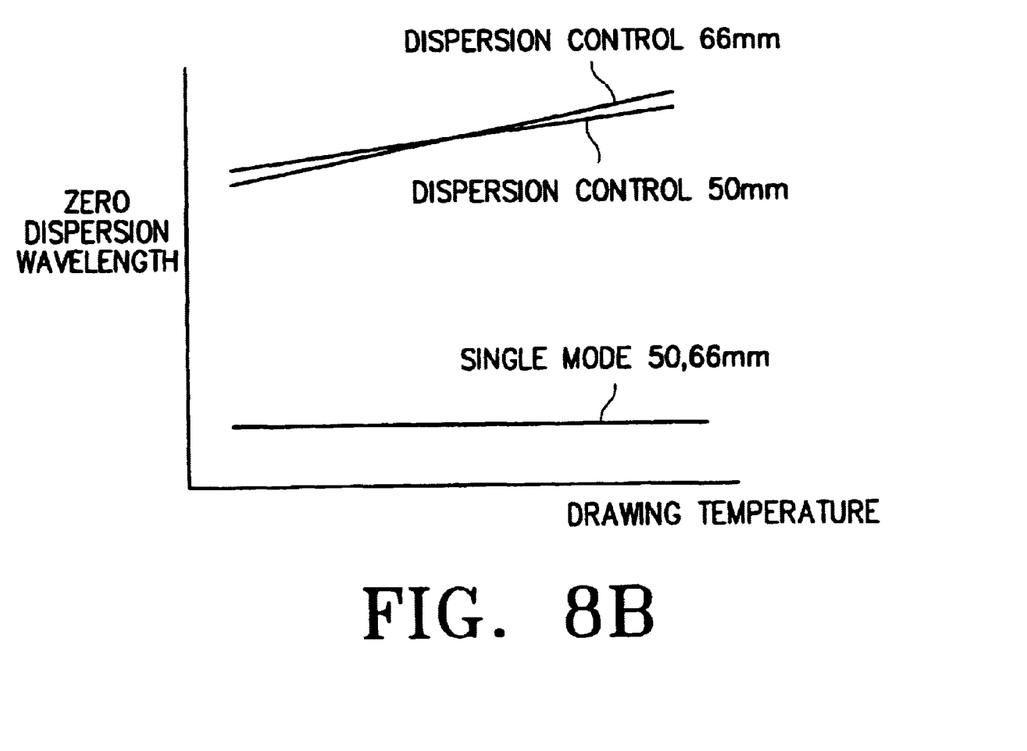

FIGS. 8A and 8B are graphs showing the relationship between a temperature of drawing an optical fiber and a changing amount of a zero dispersion wavelength of a large size preform of a dispersion control fiber according to a prior art and the present invention, respectively As can be seen from FIG. 8A, if the diameter of the preform according to the prior art is changed from 50 mm to 66 mm, the variation of the zero dispersion wavelength according to the drawing temperature becomes large. However, as can be seen from FIG. 8B, if the diameter of the preform according to the present invention is changed from 50 mm to 66 mm, the variation of the zero dispersion wavelength according to the drawing temperature becomes small.

TABLE 2

| Example | Diameter of preform (nsm) | Class | Composition of core | Composition of cladding | Variation of optical characteristics | | | Shrink deformation of deposition tube |
|---|---|---|---|---|---|---|---|---|
| | | | | | Zero dispersion wavelength (nm) | Mode field diameter (μm) | Dispersion slope (ps/nm²km) | |
| 1* | 66 | D.C.F. | S + G | S + G + P + F | 20~40 | 0.2~0.5 | 0.004~0.000 | No |
| 2* | 66 | D.C.F. | S + G + P | S + G + P + F | 0~2 | 0~02 | 0~0.001 | No |
| 3* | 66 | D.C.F. | S + G + P + F | S + G + P + F | 1~3 | 0~0.2 | 0~0.001 | No |
| 4* | 66 | D.C.F. | S + G | S + G | 3~5 | 0~0.2 | 0~0.002 | Serious |
| 5* | 66 | D.C.F. | S + G | S + G + F | 3~7 | 0~0.2 | 0~0.001 | Serious |

Variation of drawing temperature depending on the increasing diameter of preform: 20° C., diameter of core: 8~8 μm,
Relative refractive index ratio(%): 0.15~0.7
1* Example 4 of the prior art,
2* Example 1 of the present invention,
3* Example 2 of the present invention,
4* Comparative Example 1,
5* Comparative Example 2.
D.C.F. represents a dispersion control fiber.

The example 1 (2*) is a large size preform that consisted of a core composed of $SiO_2$, $GeO_2$, and $P_2O_5$, and a cladding composed of $SiO_2$, $GeO_2$, $P_2O_5$, and Freon, as shown in FIG. 4. An optical fiber is drawn from the preform, and is tested for the optical characteristic, such as zero dispersion wavelength, the mode field diameter, and the dispersion slope, and the shrink deformation of the deposition tube.

Comparing the example 1 (2*) with the example 4 (1*) of the prior art, of which an optical fiber is drawn from a large size preform consisting of a core composed of $SiO_2$ and $GeO_2$, it is noted that the variation of optical characteristics is significantly reduced. Specifically, the zero dispersion wavelength is varied from 20~40 nm to 0~2 nm, the mode field diameter is varied from 0.2~0.5 mm to 0~0.2 mm, and the dispersion slope is varied from 0.004~0.009 ps/nm² to 0~0.001 ps/nm².

The example 2 (3*) is a large size preform consisting of a core composed of $SiO_2$, $GeO_2$, $P_2O_5$, and Freon, and a The dispersion control fiber according to the present invention has an advantage in that even though the drawing temperature is increased to draw the dispersion control, fiber from the large size preform of the present invention, the variation of the optical characteristics is minimized.

In addition, according to the present invention, the temperature of depositing the core is reduced to prevent a shrinkage of the deposition tube from occurring, and a sintering temperature can be also reduced. Also, the processing time desired for the collapsing can be reduced.

While this invention has been described in connection with what is presently considered to be the most practical and preferred embodiments, it is to be understood that other modifications thereof may be made without departing from the scope of the invention. Thus, the invention should not be limited to the disclosed embodiments, but should be defined by the scope of the appended claims and their equivalents.

What is claimed is:

1. A dispersion control fiber, comprising: a core formed of a compound consisting essentially of $SiO_2$, $GeO_2$, and $P_2O_5$; and a cladding formed of a compound consisting essentially of $SiO_2$, $GeO_2$, $P_2O_5$, and Freon.

2. The dispersion control fiber as claimed in claim 1, further comprised of an amount of the $P_2O_5$ in the core is selected not to exceed 10% of a total weight of the compound forming the core.

3. The dispersion control fiber as claimed in claim 1, further comprised of a relative refractive difference between the core and the cladding is above 0.35.

4. The dispersion control fiber as claimed in claim 1, further comprised of a compound ratio of the $P_2O_5$ in the core to the compound forming the core is selected to one of increase and decrease from a center of the core to a periphery of the core.

5. The dispersion control fiber as claimed in claim 1, further comprised of a compound ratio of the $P_2O_5$ in the core to the compound forming the core is selected to be maintained independently of any position in a cross section of the core.

6. A dispersion control fiber, comprising:
a core formed of a compound consisting essentially of $SiO_2$, $GeO_2$, and $P_2O_5$;
a first cladding formed of a compound consisting essentially of $SiO_2$, $GeO_2$, $P_2O_5$, and Freon, and the first cladding being disposed around an outer periphery of the core; and
a second cladding formed of $SiO_2$ only, and the second cladding being disposed around an outer periphery of the first cladding.

7. The dispersion control fiber as claimed in claim 6, further comprised of an amount of the $P_2O_5$ in the core is selected not to exceed 10% of a total weight of the compound forming the core.

8. A method of manufacturing a large size preform for a dispersion control fiber by a modified chemical vapor-phase deposition (MCVD) process, the method comprising the steps of:
depositing $SiO_2$, $GeO_2$, $P_2O_5$, and Freon on an inner periphery of a deposition tube to form a cladding layer of a compound consisting essentially of $SiO_2$, $GeO_2$, $P_2O_5$, and Freon; and
depositing $SiO_2$, $GeO_2$, and $P_2O_5$ on an inner periphery of the cladding layer to form a core layer of a compound consisting essentially of $SiO_2$, $GeO_2$, and $P_2O_5$.

* * * * *